(12) United States Patent
Mohamed

(10) Patent No.: US 9,512,649 B2
(45) Date of Patent: Dec. 6, 2016

(54) BICYCLE SECURITY DEVICE

(71) Applicant: Mohamed Mohamed, Emeryville, CA (US)

(72) Inventor: Mohamed Mohamed, Emeryville, CA (US)

( * ) Notice: Subject to any disclaimer, the term of this patent is extended or adjusted under 35 U.S.C. 154(b) by 0 days.

(21) Appl. No.: 14/715,521

(22) Filed: May 18, 2015

(65) Prior Publication Data

US 2016/0090754 A1    Mar. 31, 2016

Related U.S. Application Data

(60) Provisional application No. 62/055,908, filed on Sep. 26, 2014.

(51) Int. Cl.

| E05B 71/00 | (2006.01) |
|---|---|
| E05B 39/00 | (2006.01) |
| E05B 45/06 | (2006.01) |
| E05B 47/00 | (2006.01) |
| E05B 47/02 | (2006.01) |
| B62H 5/14 | (2006.01) |
| B62H 5/20 | (2006.01) |
| B62J 99/00 | (2009.01) |

(52) U.S. Cl.
CPC ............. *E05B 71/00* (2013.01); *B62H 5/141* (2013.01); *B62H 5/147* (2013.01); *B62H 5/20* (2013.01); *E05B 39/00* (2013.01); *E05B 39/005* (2013.01); *E05B 45/06* (2013.01); *E05B 47/0001* (2013.01); *E05B 47/0012* (2013.01); *E05B 47/023* (2013.01); *B62J 2099/0013* (2013.01); *E05B 2047/0067* (2013.01)

(58) Field of Classification Search
CPC .... E05B 39/00; E05B 39/005; E05B 39/007; E05B 39/04; E05B 45/00; E05B 45/005; E05B 45/06; E05B 47/00; E05B 47/0001; E05B 47/0012; E05B 47/02; E05B 47/023; E05B 2047/0067; E05B 2047/0068; E05B 2047/0069; E05B 67/00; E05B 67/06; E05B 67/22; E05B 67/26; E05B 71/00; E05B 73/00; B62H 5/00; B62H 5/14; B62H 5/142; B62H 5/147; B62H 5/20

See application file for complete search history.

(56) References Cited

U.S. PATENT DOCUMENTS

| 3,965,709 | A | * | 6/1976 | Belke | B62H 5/003 70/227 |
|---|---|---|---|---|---|
| 4,956,982 | A | * | 9/1990 | Valley | E05B 67/383 70/18 |
| 4,980,667 | A | * | 12/1990 | Ames | B62H 5/20 340/427 |
| 5,197,310 | A | * | 3/1993 | Pedersen | B62H 5/003 70/227 |
| 6,043,733 | A | * | 3/2000 | Lind | B60R 25/102 307/10.2 |
| 8,453,481 | B2 | * | 6/2013 | Meekma | E05B 47/0012 70/25 |
| 9,109,379 | B1 | * | 8/2015 | Ranchod | E05B 67/00 |
| 2009/0188285 | A1 | * | 7/2009 | Cheng | B62H 1/02 70/233 |

(Continued)

FOREIGN PATENT DOCUMENTS

| DE | 2836530 A1 | 3/1980 | |
|---|---|---|---|
| DE | 102005041268 A1 * | 3/2007 | ............. B62H 5/147 |

(Continued)

*Primary Examiner* — Christopher Boswell
(74) *Attorney, Agent, or Firm* — Evergreen Valley Law Group; Kanika Radhakrishnan

(57) ABSTRACT

A bicycle locking device coupled to a bicycle and configured to prevent a wheel from turning. The device is configured with transceiver to communicated with a remote device to receive locking and unlocking indications and to transmit tampering indications to a remote device. The device can include an audible sound when tampering is detected.

17 Claims, 5 Drawing Sheets

(56) References Cited

U.S. PATENT DOCUMENTS

| | | | | |
|---|---|---|---|---|
| 2011/0265526 | A1* | 11/2011 | Zuraski | B62H 5/003 70/18 |
| 2014/0109631 | A1 | 4/2014 | Asquith et al. | |
| 2014/0150502 | A1* | 6/2014 | Duncan | G07C 9/00309 70/20 |
| 2014/0250954 | A1* | 9/2014 | Buzhardt | E05B 39/04 70/20 |
| 2014/0352369 | A1* | 12/2014 | Dasbach | E05B 71/00 70/15 |
| 2016/0121951 | A1* | 5/2016 | Lippman | B62H 5/20 340/427 |

FOREIGN PATENT DOCUMENTS

| | | |
|---|---|---|
| EP | 1625994 B1 | 12/2006 |
| EP | 1818246 A2 | 8/2007 |
| EP | 1712458 B1 | 11/2007 |

* cited by examiner

BICYCLE SECURITY DEVICE

CROSS REFERENCE TO OTHER APPLICATIONS

This application claims priority under 35 U.S.C. §119(e) of the co-pending U.S. provisional patent application Ser. No. 62/055,908 filed on Sep. 26, 2014 entitled "BICYCLE SECURITY DEVICE" The provisional patent application Ser. No. 62/055,908 filed on Sep. 26, 2014 entitled "BICYCLE SECURITY DEVICE" is hereby incorporated by reference in its entirety.

FIELD OF INVENTION

The present invention relates to security devices for bicycles or other vehicles having spoke wheels, or wheels having openings through which a security bar can pass through. More particularly, the present invention is in the field of bicycle locking devices.

What is needed are locking devices and systems can connect to the frame of a bicycle, that lock the drive train of the bicycle, that can give a visual indication to people of the locking device, that can and can send a remote indication to a person of the opening or tampering with the locking device or bicycle.

BACKGROUND

Current bicycle locks prevent a bicycle from being removed from an anchor. However, once the lock or anchor is broken, the bicycle can be ridden or carried away. Once removed, it is often difficult to recover the bicycle and identify the person taking the bike.

To minimize the likelihood of theft, people have concurrently used multiple types of conventional bicycle locks. However, this has the disadvantage of having to carry multiple locks, the weight of the multiple locks, and having to remember keys and lock combinations for multiple locks. Further, it can be time consuming setting up and unlocking each lock.

SUMMARY OF INVENTION

Figure 1:
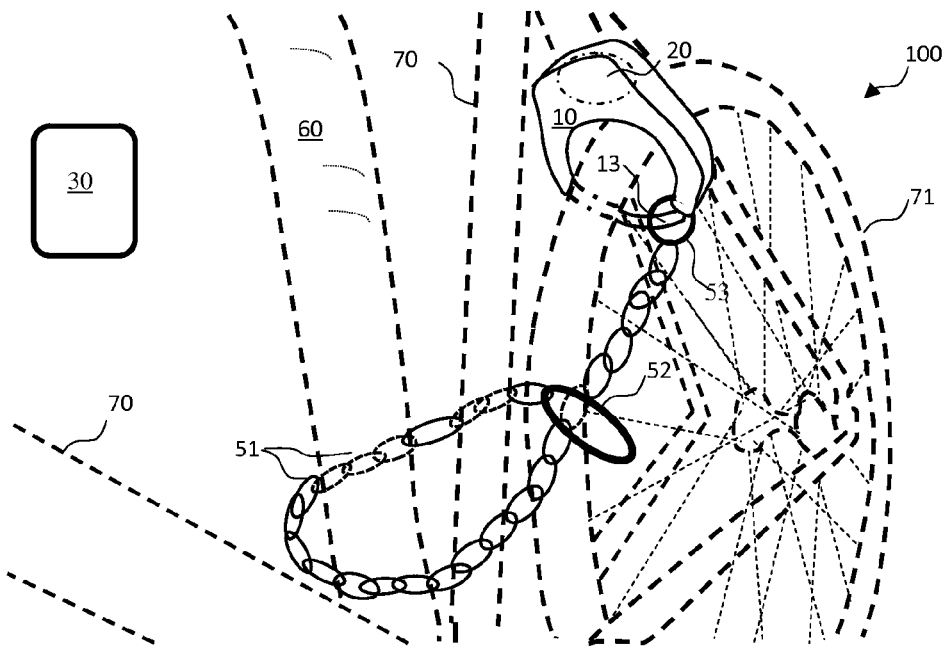
FIG. 1 is an environmental, perspective view of the locking system with the locking device coupled to a bicycle and a chain engaged with the locking ring a securing post.

Various invention embodiments provide an easy convenient way to lock a bicycle. In one embodiment, the bicycle locking device is comprised of a housing that is coupled to a bicycle frame with a mounting bracket. The housing has a housing gap through which the bike wheel passes. Within the housing is a locking ring. The locking ring is configured to rotate across the housing gap, and thereby move from an unlocked position to a locked position.

The housing includes an actuator component configured to act upon the locking ring. In one embodiment that actuator component acts upon the locking ring by engaging gear teeth formed into the locking ring.

A communications electronic component can be configured into the housing. The communications component is configured to generate an indication to the actuator to move the locking ring into a locked or unlocked position depending on the message received.

The bicycle locking device can include an accelerometer electronics component and a sound generation component. The accelerometer component detects the motion of the bicycle when locked and is configured to activate the sound generation component upon detection of motion or other indications of tampering.

The locking device can include a mounting bracket that couples to the bike and is configure to latch the lock housing to the bracket by an approximate ninety degree turn that cannot be performed when the locking device is locked to a bicycle wheel.

In another embodiment, the locking device includes a GPS receiver that can determine location, position, and velocity.

In a further embodiment, the locking device can include a lamp that can be positioned to illuminate either forward or backward. Further, the lamp can be controlled by an accelerometer unit that enables the lamp when decelerating.

In another aspect of the inventive device, a remote controller is disclosed. The controller has a body containing a transceiver that is configured to communicate wirelessly with the bicycle lock device. The remote controller includes a first function that can send a wireless message to the bicycle lock device indicating that the device should be locked. In a further embodiment, the device can include a second button that when asserted sends a wireless message to the bicycle lock to unlock the device.

DETAILED DESCRIPTION OF THE INVENTION

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

The bicycle locking system prevents a bicycle wheel from turning and couples the bike to a secure anchor. Referring to FIG. 1, the locking system 100 is shown in its operational environment. The system can include the lock device 10 coupled to a mounting bracket 20 that is coupled a bicycle 70, a locking chain 51, 52, 53, and a wireless controller 30 which includes but is not limited to a smart phone or other mobile device. The locking device 10 is coupled to the rear bicycle brake anchor through a bracket 20 designed to couple with a flange 15 which is part of the lock's rear casting 12*b*. While the lock 10 is shown coupled to the bicycle frame 70 adjacent to the rear wheel 71, the lock device 10 attachment to the front of the bicycle or at other points on the bicycle 70 is contemplated.

A wireless controller 30 is shown for use by a person to lock and unlock the locking device 10 and receive indications of bicycle 70 tampering. The wireless controller 30 can be a phone or other mobile device with wireless capabilities based on protocols for personal area networks or wide area networks, including but not limited to communication protocols based on IEEE 802.15, herein after "Bluetooth". Mobile devices include but are not limited to smart phones, personal digital assistants, iPods, and iPads. The locking chain 51 and the end rings 52, 53 are used to secure the bicycle 70 to an external anchoring device 60 such as a bike rack.

The locking system 100 can include a locking chain 51. The locking chain 51 includes two rings, 52, 53 coupled to each end of the chain 51. One ring 52 is larger than the second ring 53 and has a sufficient inside diameter to pass the chain 51 and smaller ring 53 through the inner opening of the larger ring 52. Further, the smaller ring 53 has an inner diameter sufficient for the locking ring 13 to pass through. This configuration permits the chain 51 to be put around an anchor 60, around either the bicycle wheel 71 or frame 70, through the large ring 52, and have the locking ring 13 pass though the small ring 53 and thereby securing the bicycle to the anchor 60. While the rings 52, 53 are shown to be circular, other shapes are contemplated. Alternatively, the chain 51 can be a cable (not shown) with a small loop on one end and a larger loop on the other end. The large loop should have an inner diameter large enough for the smaller loop to pass through. The smaller loop and larger loop are sized for the smaller loop to pass through the larger loop.

Figure 2:
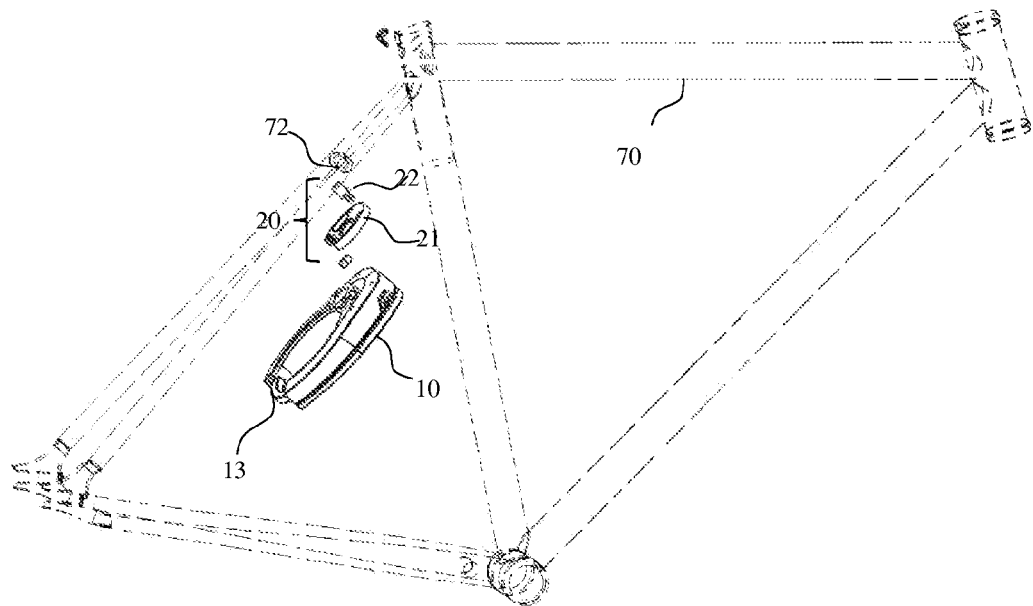
FIG. 2 is a side view of the bicycle locking device and mounting bracket.
Figure 8:
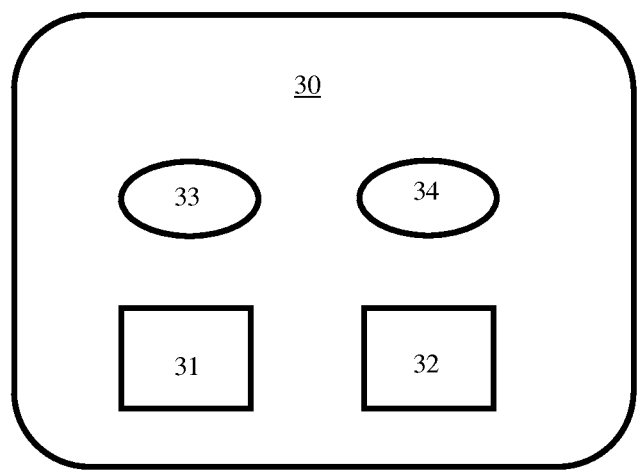
FIG. 8 is a view of a wireless controller.

Referring to FIG. 2, a side view is shown of the lock 10 and the bracket 20 in relation to the bike frame anchor hole 72. The front casting 12*a* and rear casting 12*b* includes a locking ring 13, and can include an electronic locking ring actuator, a communications module, and a sound-emitting module, and a power supply module. These modules are shown in FIGS. 3 and 8 and described in further detail below.

Figure 3:
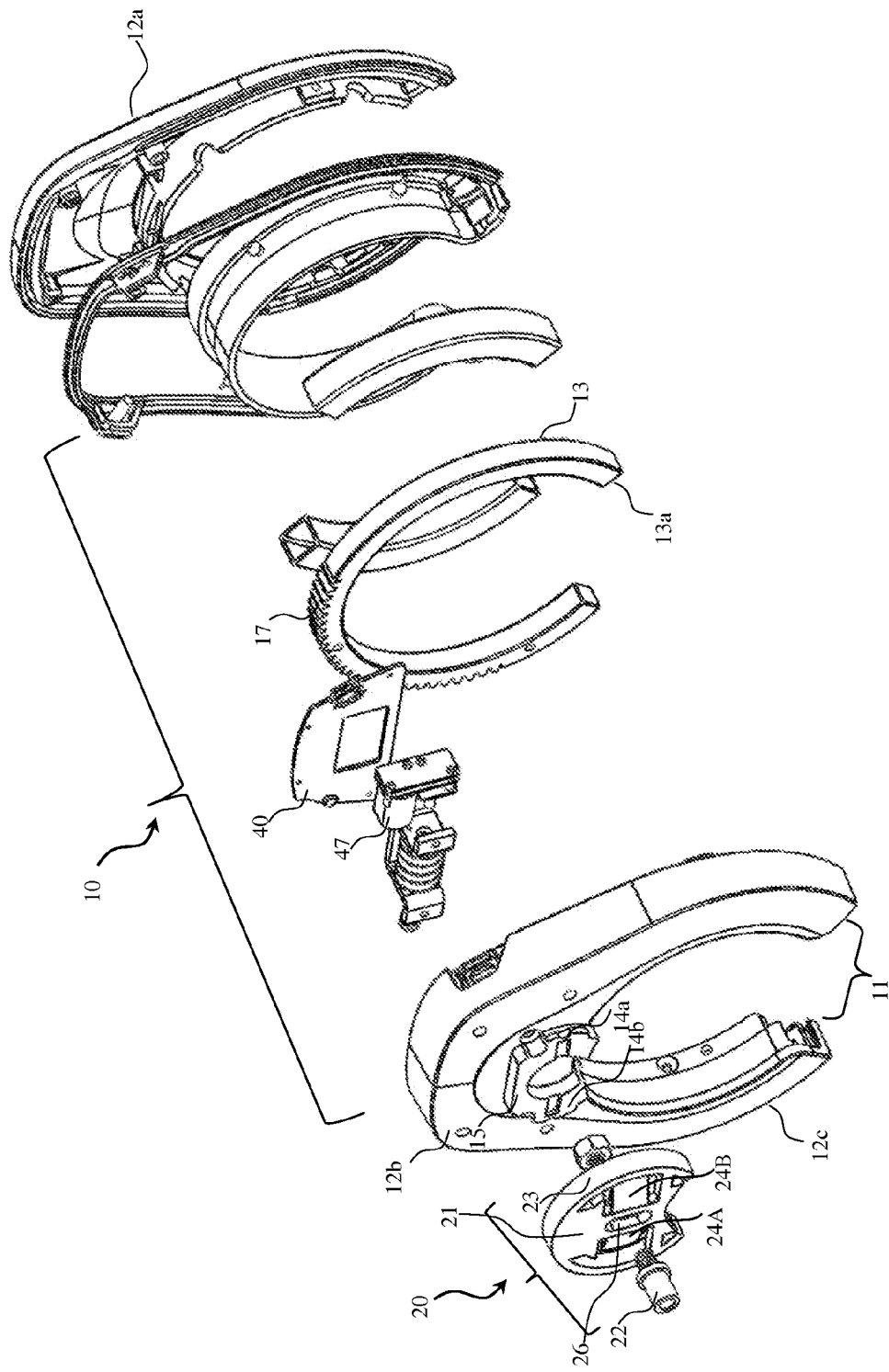
FIG. 3 is an exploded view of the bicycle locking device.

Referring to FIG. 3, an exploded view of the lock 10 and mounting bracket 20 is shown and described. The mounting bracket 20 is comprised of a mount anchor bolt 22 and a nut 23 which fits through a centered slot 26 in the bracket 21 and to the bike frame. The bracket 21 has two coupling tabs 24*a* and 24*b* formed into the bracket 21 and spaced away from a lip 16 configured to engage the lock flange tabs 14*a*, 14*b*. The anchor bolt 22 and nut 23 is configured to be compatible with coupling to rear bike brake anchor.

The major components of the lock 10 are a front casting 12*a*, a rear casting 12*b*, a locking ring 13 and a lock actuator 47 which is part of the control and communication electronics 40 components. The lock actuator 47 and control and communication electronics 40 are contained between the front 12*a* and rear casting 12*b* which protects them from the elements and tampering.

The actuator 47 acts upon the locking ring 13 to move it from a first unlock position to a second locked position and back to a first unlocked position. The control electronics component 40 is described further below.

The locking ring 13 can include teeth 17 formed into the ring 13. The teeth 17 are configured to engage with an actuator component 47. A worm gear is shown coupled with the actuator motor 47 to act on the locking ring 13. While teeth 17 are shown, other means for acting on the locking ring 13 are contemplated. These include but are not limited to using friction, electromagnetic forces, mechanical linkages, a linear actuator, rack and pinion, a spur gear, lead screw, a retracting spring or a combination thereof to act on the locking ring.

The locking ring 13 is shown in the unlocked position. The locking ring 13 rotates within the housing 12*a*, 12*b* between a first position (unlocked) and a second position (locked). The locking ring 13 preferably forms a circular arc and is positioned between the front and back casting 12*a*, 12*b* which has a channel, guide or groove within the housing casting 12A, 12B. In the first position (unlocked or retracted position), a housing gap 11 is substantially open and free from the locking ring 13. The locking ring 13 can extend small distance into the gap 11 so long as the locking ring 13 does not interfere with bike wheel 71 rotation. In the locked position, the locking ring 13 transects the housing gap 11 and meets the housing channel on the opposing side.

In one embodiment, one arm 12*c* of the front and back casting 12*a*, 12*b* has extra material to strengthen that arm 12*c*. This is the arm 12*c* from which the locking ring 13 rotates out of when locked. Because when in the locked position, one side is strengthened by the locking ring 13 but the other arm 12*c* is weaker because the locking ring 13 has rotated out of the arm 12*c*. Therefore, to prevent this weak point, the extra material can be provided in the one arm 12*c*.

Preferably the locking ring 13 is formed of a strong material that is not easy to cut, bend or break and is not flexible. These materials include but are not limited to steel, stainless steel, metal alloys, aluminum, plastics, or a combination thereof. In the open position the locking ring end 13*a* can be substantially flush with the housing channel. In the locked position, the locking ring transects the housing gap 11. The typical width of a bicycle tire is 18-40 millimeters. The housing gap 11 can be greater the 40 millimeters to accommodate most bicycle wheels. When the locking device 10 is mounted on a bicycle 30 the locking ring 13 will pass under the rim of the bicycle and prevent the wheel 71 from turning.

The rear lock casting 12*b* can include a flange 15 with two flange tabs 14*a*, 14*b*. These tabs 14*a*, 14*b* and the flange 15 are configured to engage and latch to the mounting bracket 20 when engaged and twisted together to lock the bracket 21 with the flange 15.

Figure 4:
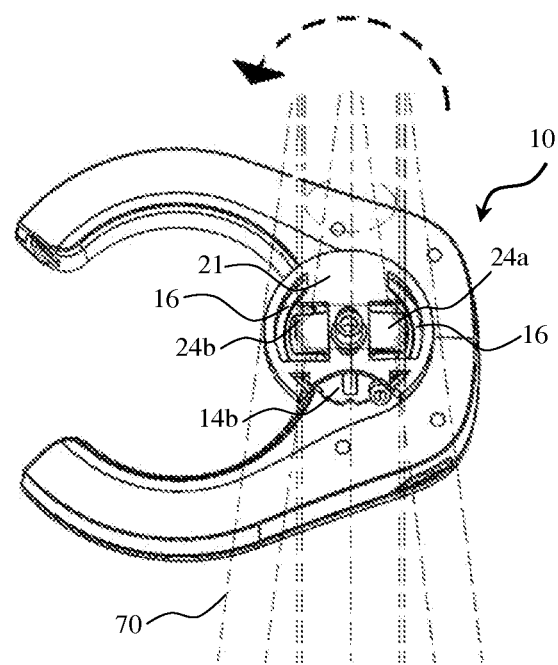
FIG. 4 is a rear view of the locking device being coupled to the mounting bracket.
Figure 5:
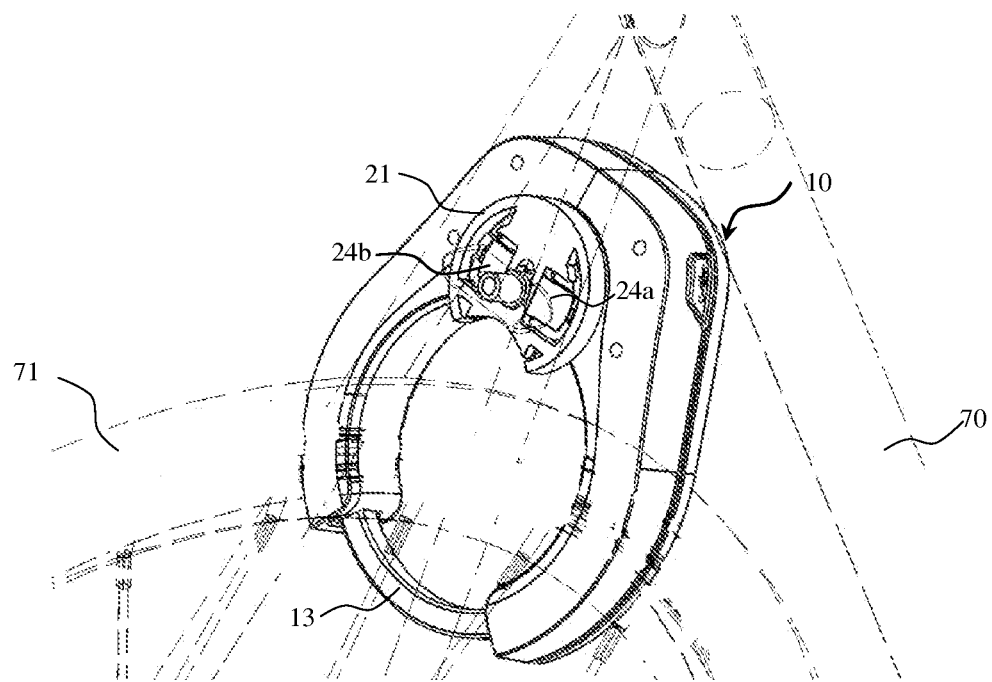
FIG. 5 is a isometric rear view of the lock coupled to the mounting bracket and locked.

Referring to FIG. 4, the lock 10 is shown positioned to couple to the mounting bracket 20. The lock 10 is positioned approximately ninety degrees rotated from the operating position as shown in FIG. 5. The lock 10, as shown, is slid upward so that the lock flange 15 and flange tabs 14*a*, 14*b* slide into a recess in the bracket 21 and rests on a lip 16 inside the bracket 21. The lock 10 is then rotated counterclockwise (as shown) which causes the flange tabs 14*a*, 14*b* slide between and be held by the lip 16 and the bracket tabs 24*a*, 24*b*. Preferably, the fit between the bracket tabs 24*a*, 24*b*, the lip 16, and the lock tabs 14*a*, 14*b* is sufficiently tight to hold the lock 10 in a secure position. The bracket tabs 24*a*, 24*b* can even be formed to flex thus providing a tight frictional fit. The bracket 21 and the lock flange 15 can have male and female protrusions that engage each other when twisted into in the operating position which will further hold the lock 10 in place.

Referring to FIG. 5, the lock 10 is shown in the operating position, coupled to the bracket 21, with the locking bar 13 engaged. The lock flange tabs 14*a*, 14*b* are behind the bracket tabs 24*a*, 24*b* and can be held in place by friction between the bracket tabs 24a, 24b and a lip 16 spaced away from the tabs 24a, 24b running along the inside of the mounting bracket 21.

Figure 6:
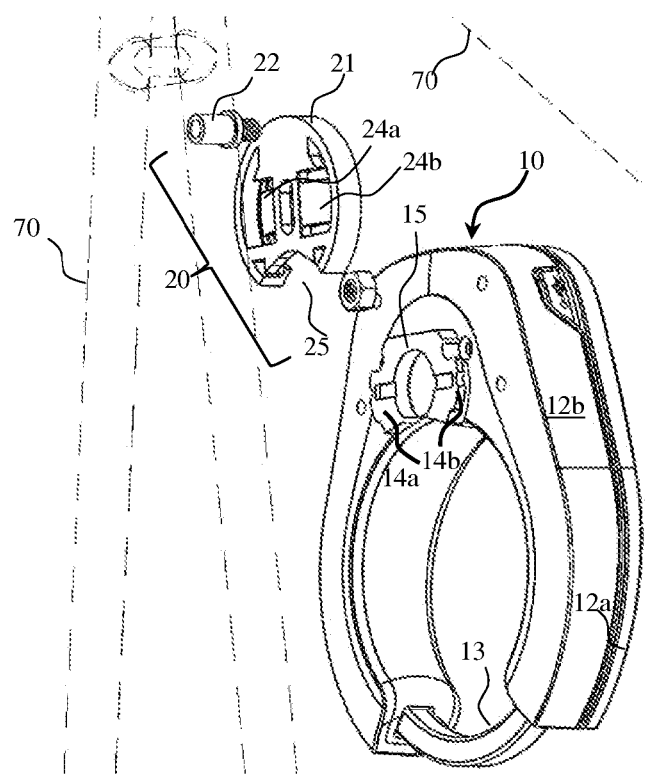
FIG. 6 is an exploded view of the lock and mounting bracket.

Referring to FIG. 6, an exploded view of the lock 10 and mounting bracket 20 is shown in relation to the bicycle 70.

Figure 7:
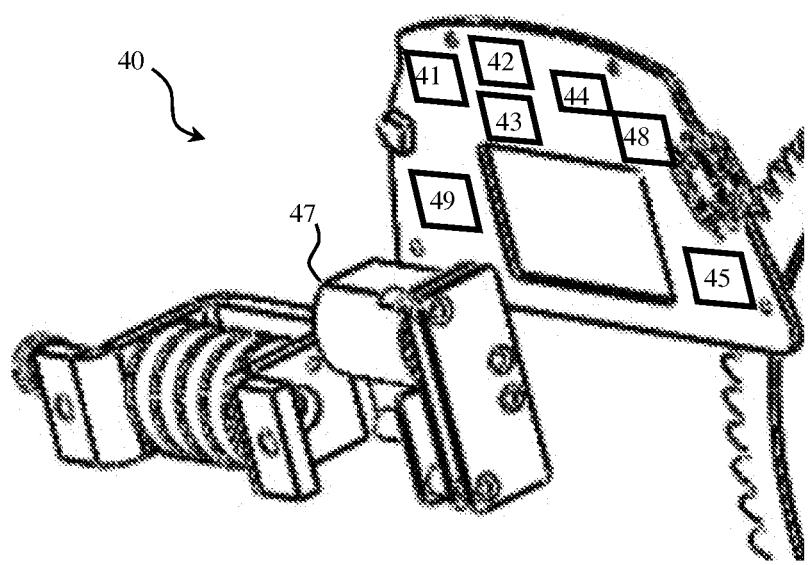
FIG. 7 is a view of the electronics module and the locking ring actuator.

The rear casting 12b can include electronic communication and control component. Referring to FIG. 7, these components are part of the electronics module 40. These components can include an electronic communications component 41, and a power supply 42, an accelerometer component 43, a temperature sensor component 44, GPS receiver 45, a sound-emitting device 48 if the bicycle locking device 10 is tampered with or the bike moved or combination thereof. The electronics 41, 42, 43, 44, 45, 47, 48 and 49 are shown located at the top of the housing but can be located in different locations within the lock 10. One skilled in the art of designing wireless communication devices and controllers would know how to design a controller and wireless communication device utilizing the desired protocols and transceivers.

Referring to FIG. 8, a view of a remote controller 30 is shown. The remote controller 30 is configured to wirelessly communicate with and control the bicycle lock 10. Preferably, a low power wireless protocol is used including but not limited to Bluetooth. The controller can be part of a mobile device with an application installed utilizing the memory, processor, and transceiver resources of the mobile device. The mobile device can include but is not limited to smart phones, mobile computers, and personal digital assistants. The control functions include but are not limited to locking and unlocking. Communication functions can include but are not limited to indications of lock 10 tampering.

Communications is provided with wireless transceiver electronics 31 and a power source 32. The wireless transceiver electronics 31 can be based on the communication standards including but not limited to Bluetooth IEEE 802.15, WiFi 802.11, Zigbee, cellular protocols, texting protocols or a combination thereof. Further the communication can utilize the Industrial Scientific Medical Band and custom protocols. One skilled in the art of building and designing low power wireless communication devices would be capable of providing these functions. The wireless transceiver electronics 31 can include control functions for processing received communications and transmitting control indications. These functions, including control and transceiver functions can be shared with the mobile devices electronics.

The wireless controller 30 can include one or more buttons for controlling the bicycle lock 10. These buttons can be part of an application on a mobile device. The wireless controller 30 can have a first function button 33. The first function button 33 can be configured to interface with the wireless communication electronics 31 to generate a bicycle lock 10 unlock message. This message is received by the bicycle lock transceiver component 49. Further, the remote controller 30 can have a second function button 34. The second function button 34 can be configured to interface with the wireless communication electronics 31 to generate a bicycle lock 10 lock message. This message is received by the bicycle lock transceiver component 49 which results in the locking ring 13 being moved to the lock position.

Other button configurations are contemplated. Control of the lock 10 can be implemented with a single button and by button pressing sequences. Further, input methods not using buttons are contemplated including but not limited to switches and motion detection devices.

In a further embodiment, the wireless controller 30 can be configured to receive an indication that tampering is occurring to the bicycle 70 or bike lock 10. A message is sent from the lock electronics 40 wirelessly to the wireless controller 30 which in turn will generate an indication on the wireless controller 30 or another device that can include but not limited to a mobile phone.

In another embodiment, the controller 30 is transmitting or receiving a wireless signal. This transmission can be either continuously or periodically. The strength of the signal from a controller 30 paired with the lock 10 is monitored by either the wireless controller 30 or the lock electronics 40. In one embodiment, the controller uses the signal strength from the lock electronics 40 to determine that the wireless controller 30 is near the lock 10. In one embodiment, the wireless controller 30 determines that it is near the lock 10, it can be configured to automatically send a wireless unlock message.

Operational Example

In operation, the lock 10 has to be first installed on the bicycle 70. First the bracket 21 needs to be coupled to the bicycle frame 70. Preferably, the bracket 21 is coupled to the bike frame 70 using the rear bike brake anchor bolt mounting hole 72. A specially designed anchor bolt 22 is required to accommodate the bike brake and the locking device 10. Once the bracket 21 is mounted to the bicycle, the rear wheel is removed.

The next step is to couple the lock 10 to the bracket 21. The back of the rear casting 12b is configured with a flange 15 with two horizontally orientated flange tabs 14a, 14b. The tabs 14a, 14b extends from the center of the flange 15 along a radial line through the center of the flange 15. The lock 10 is held substantially perpendicular to plane of the wheel 71 and slid over the mounting bracket 21. The mounting bracket 21 has two tabs 24a, 24b located approximately one hundred and eighty degrees from each other and mounted in a substantial horizontal orientation. The bracket 21 also has a recess configured to receive the lock flange 15 and lock flange tabs 14a, 14b when substantially vertically orientated. In this orientation, the lock 10 is positioned ninety degrees from its installed orientation. The bracket 21 has a lip 16 which provides a surface against which the flange tabs 14a, 14b rest. As the lock 10 is rotated and towards its installed position, the flange tabs 14a, 14b will slide between the mount tabs 24a, 24b and the lip 16. The mount tabs 24a, 24b are configured to provide a gap between the lip 16 and the mount tabs 24a, 24b that is equal to the thickness of the flange tabs 14a, 14b. Further, the mount tabs 24a, 24b can be configured to flex and thereby allowing the gap to be less than the thickness of the flange tab 14a, 14b. Once the lock 10 rotated to the installed position, the lock 10 is securely coupled to the bicycle by the friction fit of the flange tabs 14a, 14b between the lip 16 and mount tabs 24a, 24b.

Next the rear bicycle tire 71 is installed. The bike rider then rides to a location having an anchor 60 for the bicycle 70. The rider then takes his locking chain 51, wraps the chain 51 around an anchor 60 and part of the bike 70 frame, slides the small chain ring 53 through the large chain ring 52 and positions the small chain ring 53 so that when the locking ring 13 moves to the locked position, that the locking ring 13 will pass through the inside of the small ring 53.

The user then asserts a lock indicator 33 on the wireless controller 30 which sends a wireless signal, preferably using Bluetooth, which is received by the lock electronics 40. The lock electronics 40 decodes a lock message and actives the actuator 47 which acts upon the lock ring 13. Alternatively, the user can press a button or switch on the lock 10 which generate a lock indication to the lock electronics 40. The actuator 47 then acts on the lock ring 13 which rotates into a locked position. The lock electronics 40 can control a light emitting device to provide an external indication that the bike has an anti-tampering device on it.

While the rider is away from the bicycle 70, the lock electronics 40 monitors indications of tampering with the bicycle 70. Indication can be movement of the bicycle 70, changes in location as determined by GPS electronics, vibration, or a combination of these indications, the lock 10 sends a wireless message to the wireless device 30 of these indications. Further, when the lock 10 is in a locked configuration and receives a tampering indication, the lock electronics 40 can enable an audible alarm. The rider can then return to the bike and check the bicycle's status.

When the rider is ready to leave, the rider returns to his bike. The lock electronics 40 can detect that the wireless controller 30 is near the bike by monitoring the wireless signal strength of the device to which it was paired under a protocol such as Bluetooth. Once the strength reaches a predetermined level, which can include other characteristics such as remaining within a signal strength range, the electronics 40 determines that the rider has returned to his bike and automatically causes the lock ring 13 to move to an unlocked position. Such behavior can be configurable. In another embodiment, the wireless controller 30 monitors the power level from the bicycle and generates an unlock message. Alternatively, the rider asserts a button on the remote controller device 30.

What is claimed is:

1. A bicycle locking device comprising:
   a housing configured to couple to a bicycle frame, wherein a section of the housing forms a housing arc having a gap, and wherein the gap in the housing arc is wider than a bicycle tire width;
   a locking ring configured substantially within the housing arc, wherein the housing and the locking ring is configured to move between a first position where the locking ring substantially transects the gap to a second position where the gap is substantially open;
   an electronic actuator component configured to act on the locking ring to move the locking ring from the first position to the second position, and wherein the electronic actuator is configured to receive an indication to move the locking ring to the first position or to the second position;
   communication electronics component coupled to the electronic actuator component wherein the communication electronics component is configured to generate an indication to the actuator to move the locking ring into a first position or second position, wherein the communication electronics component is configured to wirelessly receive from a second device a lock or unlock message, and wherein the communication electronics component is configured to send to the second device an alert indication; and
   a locking device notification component which is activated responsive to detection of movement of the bicycle to send notification of the detected movement to the second device.

2. The device of claim 1, wherein the housing is comprised of a front casting and a rear casting, wherein the front casting and the rear casting are coupled together by a securing means.

3. The device of claim 2, wherein the securing means are bolts having a head requiring a unique tool to be removed.

4. The device of claim 2, further comprising a light-emitting component coupled to the communication electronics component and wherein the communication electronics component is configured to enable the light-emitting component when the electronic actuator has received an indication to move the locking ring to the first position.

5. The device of claim 2, further comprising a chain having a small ring attached to one end and a larger ring attached to the opposing end, wherein the inner diameter of the large ring is greater than the outer diameter of the small ring, and where in inner diameter of the small ring is greater than one half inch.

6. The device of claim 2, further comprising an accelerometer electronics component and a sound generation electronics wherein the accelerometer electronics component is configured to detect motion of the bicycling locking device when the locking ring is in the first position and wherein the accelerometer electronics component configures the sound generation electronics component to generate and output sound when motion is detected.

7. The device of claim 6, wherein the generated sound is 80 dB or greater.

8. The device of claim 2, the locking ring is configured with gear teeth on a portion of one edge of the locking ring, wherein the electronic actuator component is configured to engage with the gear teeth to move the locking ring from to the first position or to the second position.

9. The device of claim 1, further comprising a bracket configured to attach to a bicycle and a flange having two flange tabs coupled to the device, wherein the bracket has two tabs extending from the center of the bracket, wherein the mount has a partial circular opening with a lip within the inside of the partially circular opening and wherein the bracket and flange are configured to secure the device when rotated ninety degrees after substantially centering the two flange tabs within the partially circular opening.

10. The device of claim 1, further comprising a GPS receiver, wherein the receiver is located in the main housing, and wherein the GPS receiver determines location, position, velocity or a combination thereof.

11. The device of claim 1, further comprising a lamp, wherein the lamp is configured to cast a light beam forward, backward, or sideward.

12. The device of claim 11, further comprising a lamp control electronics wherein the lamp control electronics includes an accelerometer, and wherein the lamp control electronics activates the lamp when the device detects deceleration.

13. The device of claim 1 further comprising a remote controller device comprising:
   a body;
   a transceiver component, wherein the transceiver component is configure to communicate wirelessly with the locking device;
   a first function button coupled to the body, wherein the first function button is configured to enable the transceiver to transmit a first function indication; and
   an antenna coupled to the transceiver;
   a remote controller device notification component including one of i) a light-emitting device, ii) a vibratory body, and iii) a sound-emitting component, wherein the remote controller notification component is activated when the transceiver receive a tampering notification.

14. The device of claim 13, wherein the device further comprises a key, wherein the key is configured to turn bolts on a bicycle lock.

15. The device of claim 13, wherein the device further comprises a second button, wherein the second button is configured to enable the transceiver to transmit a second function indication.

16. The device of claim 13, wherein the transceiver component further comprises a Bluetooth module, wherein the Bluetooth module enables communications with a mobile phone.

17. A bicycle locking device comprising:
- a housing configured to couple to a bicycle frame, wherein a section of the housing forms a housing arc having a gap, and wherein the gap in the housing arc is wider than a bicycle wheel, and wherein the housing is comprised of a front casting and a rear casting, wherein are coupled together by a securing means, wherein the securing mean are bolts having a head requiring a unique tool to be removed;
- a locking ring configured substantially within the housing arc, wherein the housing and the locking ring is configured to move between a first position where the locking ring substantially transects the gap to a second position where the gap is substantially open, wherein the locking ring is configured with gear teeth on a portion of one edge of the locking ring, wherein the electronic actuator component is configured to engage with the gear teeth to move the locking ring from to the first position or the second position;
- an electronic actuator component configured to act on the locking ring to move the locking ring from the first position to the second position, and wherein the electronic actuator is configured to receive an indication to move the locking ring to the first position or to the second position;
- communication electronics component coupled to the electronic actuator component wherein the communication electronics component is configured to generate an indication to the actuator to move the locking ring into a first position or second position, wherein the communication electronics component is configured to wirelessly receive from a second device a lock or unlock message, and wherein the communication electronics component is configured to send to the second device an alert indication;
- an accelerometer electronics component and a sound generation electronics wherein the accelerometer electronics component is configured to detect motion of the bicycling locking device when the locking ring is in the first position and wherein the accelerometer electronics component configures the sound generation electronics component to output sound when motion is detected;
- a light-emitting component coupled to the communication electronics and wherein the communication electronics component is configured to enable the light-emitting component when the electronic actuator has received an indication to move the locking ring to the first position;
- a lamp and lamp control electronics wherein the lamp control electronics includes an accelerometer, and wherein the lamp control electronics activates the lamp when the device detects deceleration, and wherein the lamp is configured to cast a light beam forward or backward; and
- a locking device notification component which is activated responsive to detection of movement of the bicycle to send notification of the detected movement to the second device.

\* \* \* \* \*